(12) United States Patent  
Maita et al.

(10) Patent No.: US 12,415,406 B2  
(45) Date of Patent: Sep. 16, 2025

(54) AIR CONDITIONER FOR RAIL VEHICLE

(71) Applicant: HITACHI, LTD., Tokyo (JP)

(72) Inventors: Hiroshi Maita, Tokyo (JP); Hiroyuki Toyoda, Tokyo (JP); Daisuke Akimaru, Tokyo (JP); Akinori Kawasaki, Tokyo (JP); Tomoaki Taguchi, Tokyo (JP); Fumio Fujii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 75 days.

(21) Appl. No.: 17/921,370

(22) PCT Filed: Jun. 24, 2021

(86) PCT No.: PCT/JP2021/023910  
§ 371 (c)(1),  
(2) Date: Oct. 26, 2022

(87) PCT Pub. No.: WO2022/269849  
PCT Pub. Date: Dec. 29, 2022

(65) Prior Publication Data  
US 2024/0010051 A1    Jan. 11, 2024

(51) Int. Cl.  
*B60H 3/00* (2006.01)  
*B61D 27/00* (2006.01)

(52) U.S. Cl.  
CPC ....... *B60H 3/0092* (2013.01); *B61D 27/0072* (2013.01)

(58) Field of Classification Search  
CPC ............ B60H 1/00371; B60H 1/00771; B60H 1/00778; B60H 3/0085; B60H 3/0092; B61D 27/00; B61D 27/0018; B61D 27/0072; Y02T 30/00; F24F 11/43; F24F 11/48  
USPC .......................................................... 701/36  
See application file for complete search history.

(56) References Cited

U.S. PATENT DOCUMENTS

| | | | |
|---|---|---|---|
| 2003/0168043 A1* | 9/2003 | Sakurai ............ | F02M 35/10249 123/647 |
| 2006/0005738 A1* | 1/2006 | Kumar ................... | B60L 50/30 105/35 |
| 2006/0005739 A1* | 1/2006 | Kumar ................... | B60L 50/61 105/35 |

(Continued)

FOREIGN PATENT DOCUMENTS

| AU | 2019226299 A1 * | 4/2020 |
| CN | 105216812 A * | 1/2016 |

(Continued)

*Primary Examiner* — Atul Trivedi  
(74) *Attorney, Agent, or Firm* — Mattingly & Malur, PC

(57) ABSTRACT

An object of the present invention is to provide an air conditioner for a rail vehicle that is excellent in cleanliness and comfort by cleaning the air conditioner at an appropriate timing without causing discomfort to passengers. An air conditioner for a rail vehicle including a vehicle control system includes: a refrigeration cycle device 3 that can execute a cleaning operation; and an air conditioning control device 4 that controls the refrigeration cycle device, and the air conditioning control device 4 can communicate with the vehicle control system 2 and causes the refrigeration cycle device 3 to execute a cleaning operation on the basis of status information obtained from the vehicle control system 2.

7 Claims, 6 Drawing Sheets

(56) References Cited

U.S. PATENT DOCUMENTS

| | | | |
|---|---|---|---|
| 2012/0136555 A1* | 5/2012 | Okamoto | F02D 41/402 |
| | | | 701/104 |
| 2014/0193761 A1* | 7/2014 | Donnelly | B61C 17/08 |
| | | | 165/200 |
| 2018/0347844 A1* | 12/2018 | Zhao | F24F 11/32 |
| 2019/0001999 A1* | 1/2019 | Yamamoto | F25B 39/04 |
| 2019/0082240 A1* | 3/2019 | Li | F24F 11/30 |
| 2020/0041220 A1* | 2/2020 | Metropoulos | F28G 15/04 |
| 2020/0180399 A1* | 6/2020 | Tone | B60L 1/00 |
| 2020/0376927 A1* | 12/2020 | Rajaie | B60H 1/00764 |
| 2021/0086739 A1* | 3/2021 | Fischer | B61L 27/16 |
| 2021/0123623 A1* | 4/2021 | Notaro | F24F 11/58 |
| 2021/0370994 A1* | 12/2021 | Soule | B61C 17/06 |
| 2022/0118822 A1* | 4/2022 | Gutowski | B60H 1/00021 |
| 2022/0118951 A1* | 4/2022 | Gutowski | B60J 1/2016 |
| 2022/0118952 A1* | 4/2022 | Gutowski | B60W 10/30 |
| 2022/0281495 A1* | 9/2022 | Green | B61L 21/10 |

FOREIGN PATENT DOCUMENTS

| | | | | | |
|---|---|---|---|---|---|
| CN | 106274942 A | * | 1/2017 | | B61D 27/00 |
| CN | 106347395 A | * | 1/2017 | | B61D 27/0018 |
| CN | 109269014 A | * | 1/2019 | | F24F 11/64 |
| CN | 111216751 A | * | 6/2020 | | B61D 17/02 |
| CN | 111976767 A | * | 11/2020 | | B61D 27/0018 |
| CN | 112172842 A | * | 1/2021 | | B61D 27/009 |
| CN | 112727734 A | * | 4/2021 | | F04B 39/16 |
| CN | 113085931 A | * | 7/2021 | | G06V 40/10 |
| CN | 216655623 U | * | 6/2022 | | |
| CN | 116642717 A | * | 8/2023 | | G01M 17/08 |
| CN | 219511809 U | * | 8/2023 | | |
| CN | 117485388 A | * | 2/2024 | | B61D 27/0018 |
| CN | 117719546 A | * | 3/2024 | | |
| CN | 118722746 A | * | 10/2024 | | B61D 27/0018 |
| DE | 102010010867 A1 | | 9/2011 | | |
| DE | 202010018251 U1 | | 3/2015 | | |
| DE | 102022109471 A1 | * | 10/2023 | | B60W 10/04 |
| DE | 102022109475 A1 | * | 10/2023 | | B60H 3/0085 |
| DE | 102022109476 A1 | * | 10/2023 | | B60W 10/04 |
| EP | 2368733 A | | 9/2011 | | |
| EP | 3369595 A1 | * | 9/2018 | | F24F 8/22 |
| EP | 3470287 A1 | * | 4/2019 | | B61D 27/0018 |
| EP | 3505840 B1 | * | 8/2021 | | B61D 27/0018 |
| EP | 4477491 A1 | * | 12/2024 | | B60H 1/00907 |
| GB | 2594340 A | * | 10/2021 | | B61L 27/10 |
| GB | 2598486 A | * | 3/2022 | | B61D 27/0018 |
| GB | 2598487 A | * | 3/2022 | | B61D 27/0018 |
| JP | 10-59178 A | | 3/1998 | | |
| JP | 2013-107482 A | | 6/2013 | | |
| JP | 2018-103939 A | | 7/2018 | | |
| JP | 6400147 B1 | | 10/2018 | | |
| JP | 2019-215149 A | | 12/2019 | | |
| JP | WO2019116801 A1 | * | 4/2020 | | B60L 1/02 |
| JP | 2021112054 A | * | 8/2021 | | |
| JP | 2022122743 A | * | 8/2022 | | |
| JP | 2023173297 A | * | 12/2023 | | B61D 17/12 |
| KR | 100831652 B1 | * | 5/2008 | | B01D 46/00 |
| KR | 20100122995 A | * | 11/2010 | | B61D 27/0018 |
| KR | 101524200 B1 | * | 6/2015 | | B61D 27/00 |
| KR | 102120582 B1 | * | 6/2020 | | B61D 27/0018 |
| KR | 102400317 B1 | * | 5/2022 | | B60H 1/0073 |
| KR | 102400318 B1 | * | 5/2022 | | B60H 1/0073 |
| KR | 102575051 B1 | * | 9/2023 | | B61L 15/0081 |
| WO | WO-2017212607 A1 | * | 12/2017 | | B61D 27/0018 |
| WO | WO-2022127140 A1 | * | 6/2022 | | B61C 17/04 |
| WO | WO-2022269849 A1 | * | 12/2022 | | B61D 27/00 |
| WO | WO-2023030831 A1 | * | 3/2023 | | B60H 1/00371 |

\* cited by examiner

AIR CONDITIONER FOR RAIL VEHICLE

TECHNICAL FIELD

The present invention relates to an air conditioner for a rail vehicle.

BACKGROUND ART

Most of dust or the like suspended in the inner air of a railroad vehicle is naturally discharged to the outside of the vehicle through openings such as ventilators and doors, but some of them adhere to the wall surfaces and floor surfaces of the vehicle and the inside of an air conditioning device. Even if dust or the like adheres to the wall surfaces and floor surfaces, it is removed by periodic cleaning work, and its sanitation is maintained. On the contrary, the cleaning work of the inside of the air conditioning device is often performed only when the maintenance work is performed. Due to an increase in cleanliness-consciousness in recent years, it is desirable to perform regular cleaning work even for the inside of the air conditioning device, but from the viewpoint of suppressing labor costs and the like, the demand for automation thereof is increasing.

As a technique for automatically cleaning a heat exchanger configuring an air conditioning device, there is a technique described in, for example, Patent Literature 1. In this technique, the temperature of the heat exchanger is lowered to cover the surface of the heat exchanger with frost or ice, and then the temperature of the heat exchanger is raised to thaw the frost and the like and remove dust on the surface of the heat exchanger, and the operation thereof is referred to as freeze cleaning.

However, since the air conditioning operation cannot be performed during the freeze cleaning operation, when this technology is applied to an air conditioner for a railroad vehicle, there is a possibility that the comfort of the inside of the vehicle is deteriorated to cause discomfort to passengers depending on the operation timing.

CITATION LIST

Patent Literature

Patent Literature 1: Japanese Patent No. 6400147

SUMMARY OF INVENTION

Technical Problem

An object of the present invention is to provide an air conditioner for a rail vehicle that is excellent in cleanliness and comfort by cleaning the air conditioner at an appropriate timing without causing discomfort to passengers.

Solution to Problem

In order to solve the above problems, one of representative air conditioners for a rail vehicle of the present invention can be achieved by an air conditioner for a rail vehicle including a vehicle control system, the conditioner including: a refrigeration cycle device that can execute a cleaning operation; and an air conditioning control device that controls the refrigeration cycle device, wherein the air conditioning control device can communicate with the vehicle control system and causes the refrigeration cycle device to execute a cleaning operation on the basis of status information obtained from the vehicle control system.

Advantageous Effects of Invention

According to the present invention, it is possible to provide an air conditioner for a rail vehicle that is excellent in cleanliness and comfort by cleaning the air conditioner at an appropriate timing without causing discomfort to passengers.

Problems, configurations, and effects other than those described above will be clarified by the following description of the embodiments.

DESCRIPTION OF EMBODIMENTS

Hereinafter, embodiments of the present invention will be described by using the drawings. A rail vehicle is a general term for vehicles that run along laid tracks, and means a railroad vehicle, a streetcar, a new transportation system vehicle, and a monorail vehicle. Hereinafter, embodiments of the present invention will be described with reference to the drawings by exemplifying a railroad vehicle as a representative example of the rail vehicle. Accordingly, an air conditioning device for a railway vehicle of the embodiments configures an air conditioning device for a rail vehicle of the present invention.

In the embodiments, status information of the vehicle includes, but is not limited to, information of an identification number (train number) for specifying the vehicle, information of whether or not the vehicle is activated, information of whether or not the vehicle is in a deadhead state, information of whether or not the current position of the vehicle is in a vehicle base, information of instructing an air conditioning control device 4 to perform cleaning control, information (time information) of whether or not the current time is within business operation hours, information (date information) of whether or not the current date is within a period during which cooling is used, and the like. However, the air conditioning control device 4 may store the business operation hours in advance to determine whether or not the current time is within the business operation hours from the built-in clock, or may store the period during which cooling is used in advance to determine whether or not the current date is within the period during which cooling is used from the built-in clock.

First Embodiment

Figure 1:
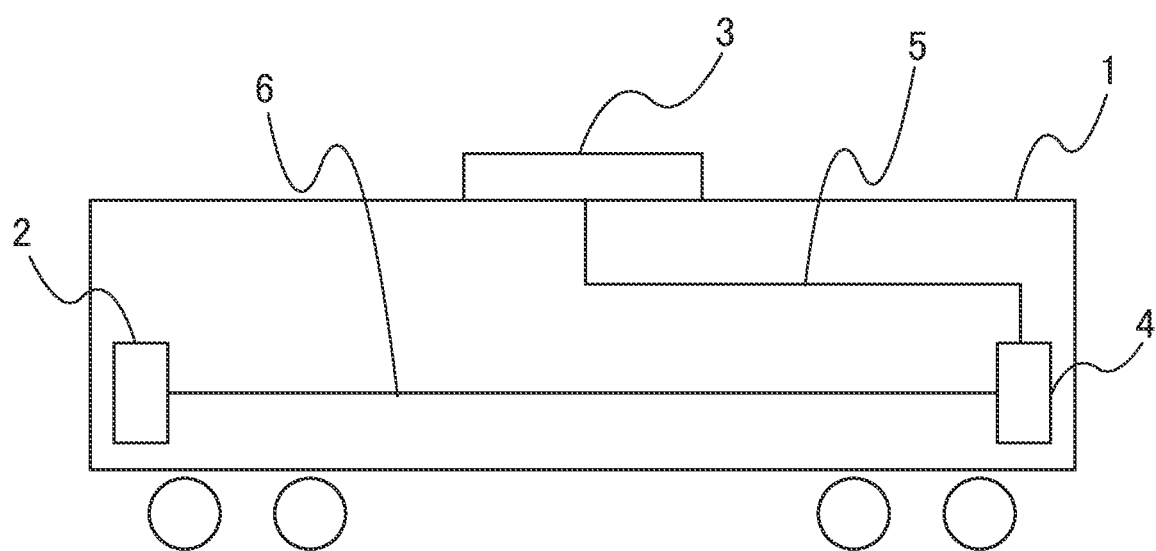
FIG. 1 is a schematic diagram for showing a relationship between an air conditioner according to an embodiment of the present invention and a vehicle.

A first embodiment of the present invention relates to control for performing a cleaning operation during deadheading after the vehicle is activated. The first embodiment will be described by using FIG. 1 and FIG. 2. FIG. 1 is a schematic diagram for showing a relationship between an air conditioner according to the present invention and a vehicle. The air conditioner of the embodiment is configured using a refrigeration cycle device 3 and an air conditioning control device 4, both of which are connected to each other by at least a communication line 5.

The air conditioning control device 4 is also connected to a vehicle control system 2 that controls various information of the vehicle by a communication line 6. The refrigeration cycle device 3 is configured using a compressor, an outdoor heat exchanger, an indoor heat exchanger, a throttling device, an outdoor blower, an indoor blower, an outdoor temperature sensor, an in-vehicle temperature sensor, and the like, and the compressor, the blowers, the throttling device, and the like are driven on the basis of a command from the air conditioning control device 4. The air conditioning control device 4 controls the refrigeration cycle device 3 on the basis of an air conditioning command from the vehicle control system 2. The refrigeration cycle device 3 can clean the heat exchangers by a freeze cleaning operation. However, the cleaning of the heat exchangers is not limited to the freeze cleaning operation. In addition, the air conditioning control device 4 can obtain information on various current states of the train from the vehicle control system 2 in addition to the air conditioning command.

Figure 2:
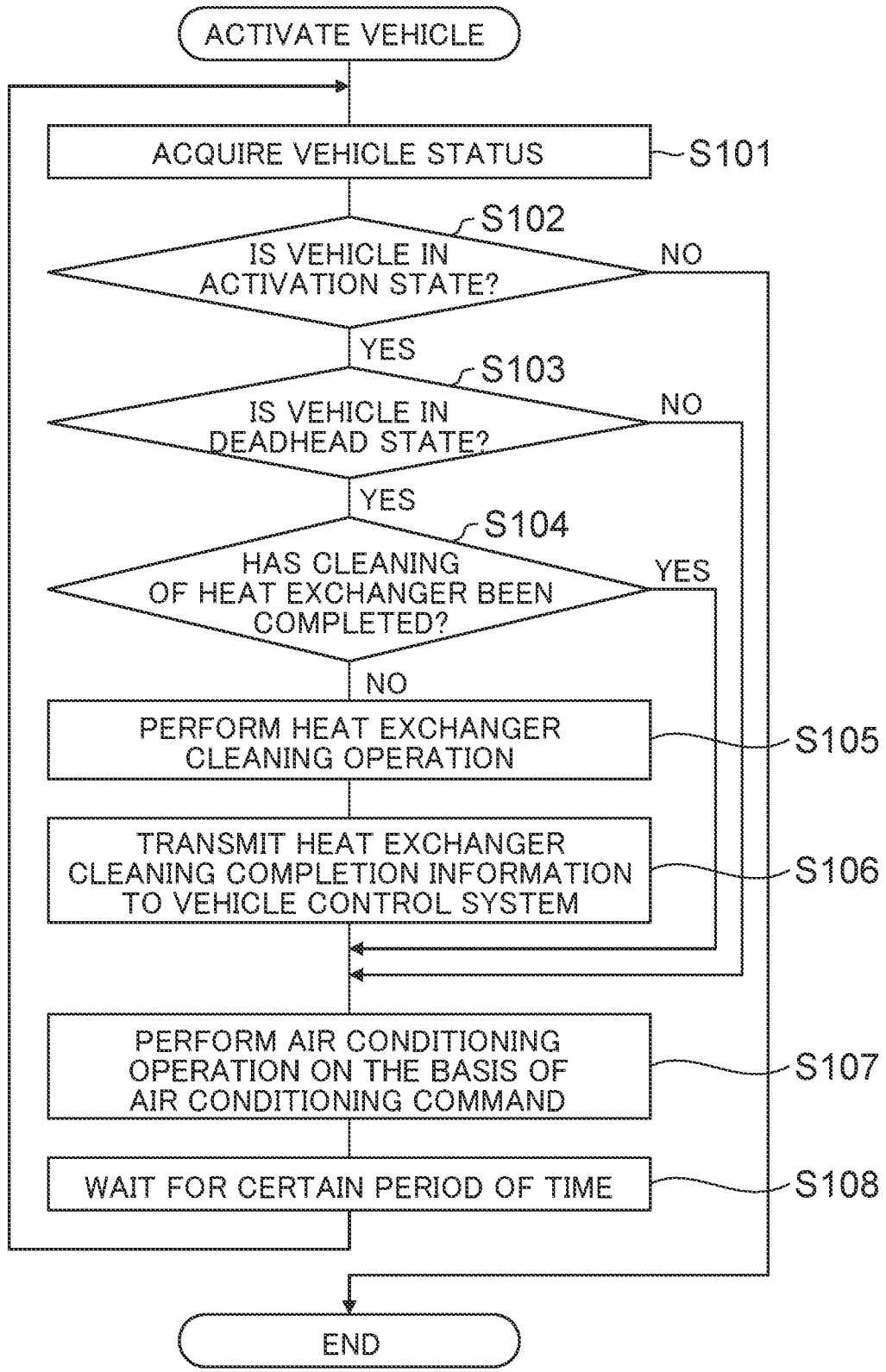
FIG. 2 is a flowchart of control according to a first embodiment of the present invention.

Next, a flow of control performed by the air conditioning control device 4 will be described by using FIG. 2 that is a flowchart of control of the embodiment. The control starts when the vehicle is powered and activated. After activating the vehicle, the air conditioning control device 4 acquires status information of the vehicle from the vehicle control system 2 via the communication line 6 (Step S101). Thereafter, the activation state of the vehicle is determined on the basis of the status information (Step S102), and if it is determined that the vehicle is not activated, the air conditioning control device 4 terminates the control.

On the other hand, in the case where it is determined in Step S102 that the vehicle is in the activation state, the air conditioning control device 4 determines whether or not the vehicle is in the deadhead state in Step S103. Whether or not the vehicle is in the deadhead state may be determined by using information of whether or not the vehicle is in the deadhead state among the status information of the vehicle acquired from the vehicle control system 2, or by using train number information in the case where whether or not the vehicle is in the deadhead state can be determined from the train number information. In addition, in the case where an operation schedule is set for each train, the air conditioning control device 4 can collate the train number information and the current time with the operation schedule to perform the cleaning operation when it is determined that the vehicle is not operated.

Since the vehicle is in the normal operation state in the case where it is determined in Step S103 that the vehicle is not in the deadhead state, the air conditioning control device 4 performs an operation on the basis of the air conditioning command from the vehicle control system 2 (Step S107).

On the other hand, in the case where it is determined in Step S103 that the vehicle is in the deadhead state, the air conditioning control device 4 then determines whether the cleaning of the heat exchangers has been completed (Step S104). In the case where it is determined that the cleaning has been completed, the flow proceeds to Step S107 in which the air conditioning control device 4 performs the operation on the basis of the air conditioning command from the vehicle control system 2. On the contrary, in the case where it is determined that the cleaning has not been completed, the air conditioning control device 4 performs the cleaning operation of the heat exchangers (Step S105), transmits heat exchanger cleaning completion information to the vehicle control system (Step S106), and performs the operation on the basis of the air conditioning command from the vehicle control system 2 (Step S107). Thereafter, the air conditioning control device 4 waits for a certain period of time (Step S108), returns to Step S101 to acquire the vehicle status again, and repeats the determination and control from Step S102. Since the heat exchanger cleaning completion information is transmitted to the vehicle control system in Step S106, the cleaning completion can also be grasped on the vehicle system side, and the information can be displayed to the crews or the cleaning history can be managed as a vehicle system.

By performing the control in this manner, the cleaning operation can be performed during the deadhead operation in which no passengers are on board, so that the cleaning operation of the heat exchangers can be performed at a timing when no passengers feel discomfort. That is, it is possible to provide an air conditioner for a railroad vehicle that is excellent in cleanliness and comfort by cleaning the heat exchangers in the air conditioner without causing discomfort to passengers.

Second Embodiment

A second embodiment of the present invention relates to control for performing a cleaning operation when the vehicle is in a base after the vehicle is activated. The second embodiment will be described by using FIG. 3 while focusing on the difference from the first embodiment. The configuration of an air conditioner for a railroad vehicle according to the embodiment is the same as that of the first embodiment shown in FIG. 1.

Figure 3:
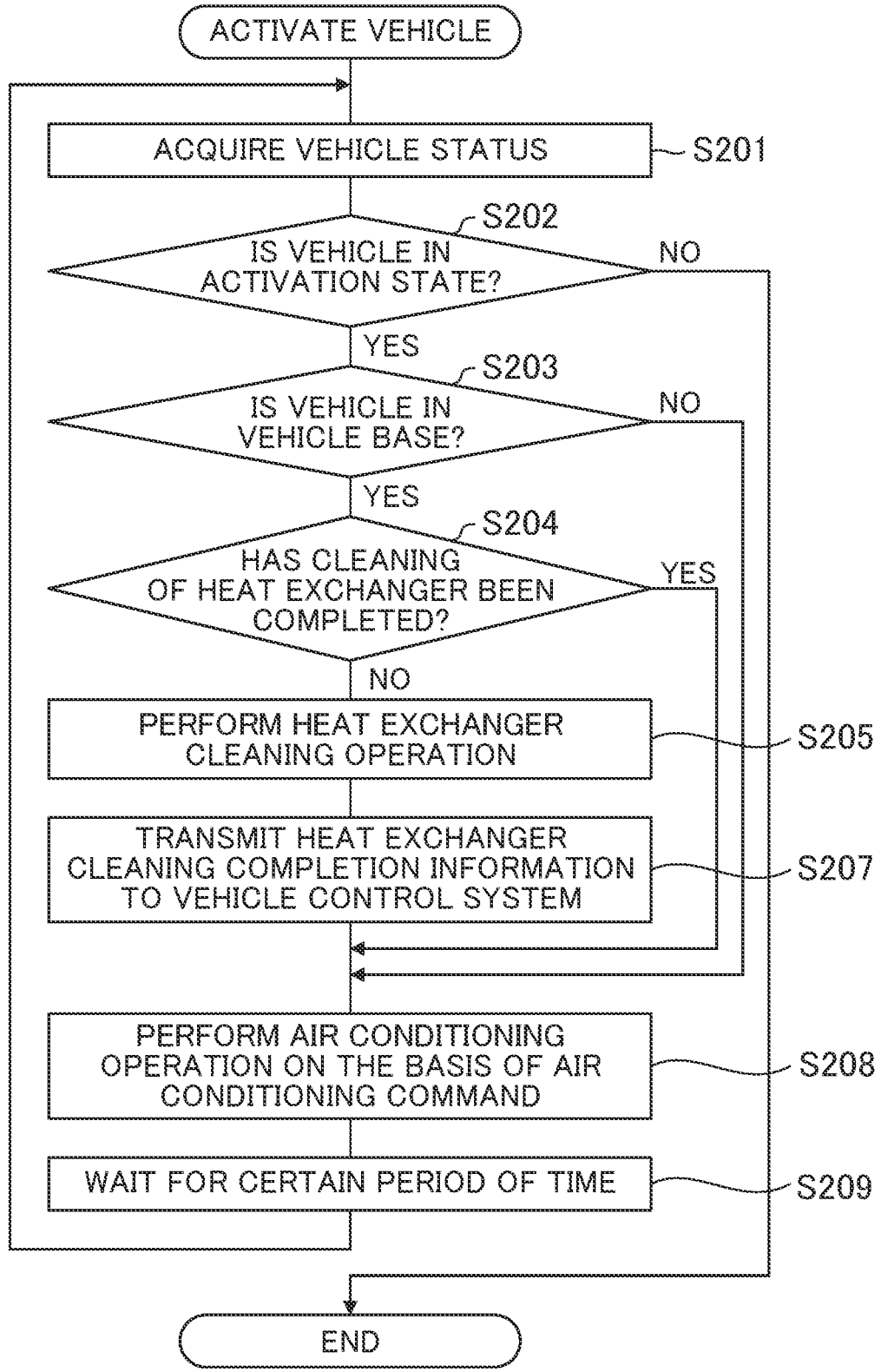
FIG. 3 is a flowchart of control according to a second embodiment of the present invention.

FIG. 3 is a flowchart of control of the air conditioning control device 4. The difference from the first embodiment is that the step (Step S103 in FIG. 2) in which the air conditioning control device 4 determines whether or not the vehicle is in the deadhead state in the first embodiment is replaced with a step (Step S203) of determining whether or not the vehicle is in a vehicle base. Since the other controls (Steps S201 to S202 and S204 to S209) are the same as those (Steps S101 to S102 and S104 to S108) of the first embodiment, the duplicated description is omitted.

The determination of whether or not the vehicle is in the vehicle base in Step S203 can be made by the air conditioning control device 4 from information related to the current location such as kilometers (distance from a certain point) and point information among the status information of the vehicle acquired in Step S201.

In general, in the case where the vehicle is in the vehicle base, it is considered that no passengers are on board, so that by performing the control in this manner, the cleaning operation of the heat exchangers can be performed at a timing when no passengers feel discomfort. That is, it is possible to provide an air conditioner for a railroad vehicle that is excellent in cleanliness and comfort by cleaning the heat exchangers in the air conditioner without causing discomfort to passengers.

Third Embodiment

A third embodiment of the present invention relates to control for performing a cleaning operation in response to a command from the vehicle control system. The third embodiment will be described by using FIG. 4. The configuration of an air conditioner for a railroad vehicle according to the embodiment is the same as that of the first embodiment shown in FIG. 1.

Figure 4:
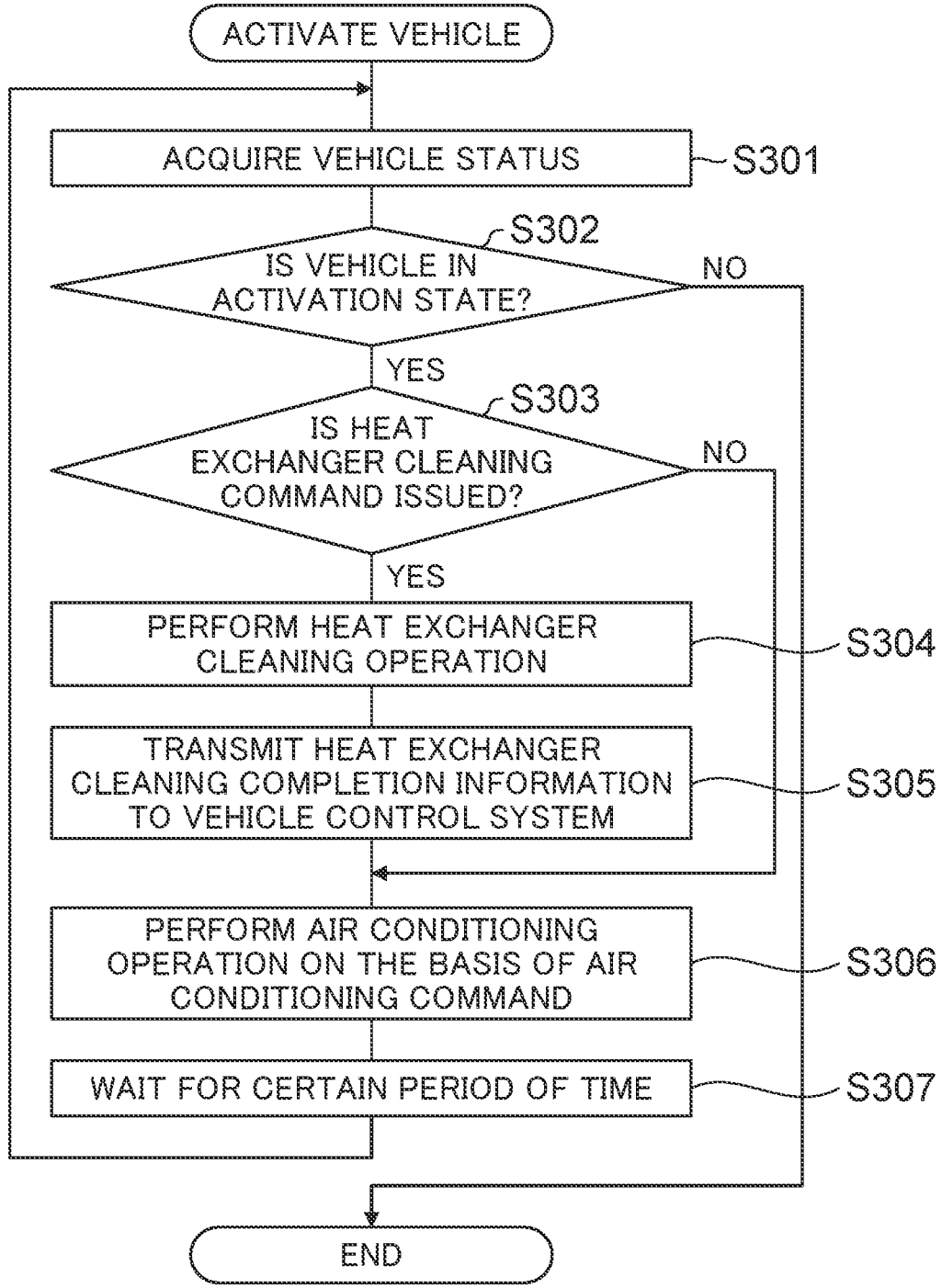
FIG. 4 is a flowchart of control according to a third embodiment of the present invention.

FIG. 4 is a flowchart of control of the air conditioning control device 4. The control starts when the vehicle is powered and activated. After the vehicle is activated, the air conditioning control device 4 acquires the status information of the vehicle from the vehicle control system 2 via the communication line 6 (Step S301). Thereafter, the activation state of the vehicle is determined on the basis of the status information (Step S302), and if it is determined that the vehicle is not activated, the air conditioning control device 4 terminates the control.

On the other hand, in the case where it is determined in Step S302 that the vehicle is in the activation state, the air conditioning control device 4 determines in Step S303 whether or not a heat exchanger cleaning command is issued from the status information of the vehicle acquired in the previous step. Here, in the case where it is determined that there is no cleaning command, the air conditioning control device 4 performs an air conditioning operation on the basis of the air conditioning command (Step S306).

In the case where it is determined that there is a cleaning command, the air conditioning control device 4 performs the heat exchanger cleaning operation (Step S304), and transmits the information to the vehicle control system after the completion of the cleaning (Step S305). Thereafter, the air conditioning control device 4 performs an operation on the basis of the air conditioning command from the vehicle control system 2 (Step S306). Further, the air conditioning control device 4 waits for a certain period of time (Step S307), returns to Step S301 again to acquire the vehicle status, and repeats the determination and control from Step S302.

By performing the control in this manner, even in a situation where it is not easily determined whether there are passengers in the vehicle or whether the vehicle is in commercial operation, for example, in the case where the vehicle stops at a station platform and is standing by with the doors closed, the cleaning of the heat exchangers can be performed in accordance with the determination on the vehicle system side. That is, it is possible to provide an air conditioner for a railroad vehicle that is excellent in cleanliness and comfort by cleaning the heat exchangers in the air conditioner without causing discomfort to passengers according to the determination on the vehicle system side.

Fourth Embodiment

A fourth embodiment of the present invention relates to control in which a condition on the basis of a set time is added to the first embodiment. The fourth embodiment will be described by using FIG. 5 while focusing on the difference from the first embodiment. The configuration of an air conditioner for a railroad vehicle according to the embodiment is the same as that of the first embodiment shown in FIG. 1.

Figure 5:
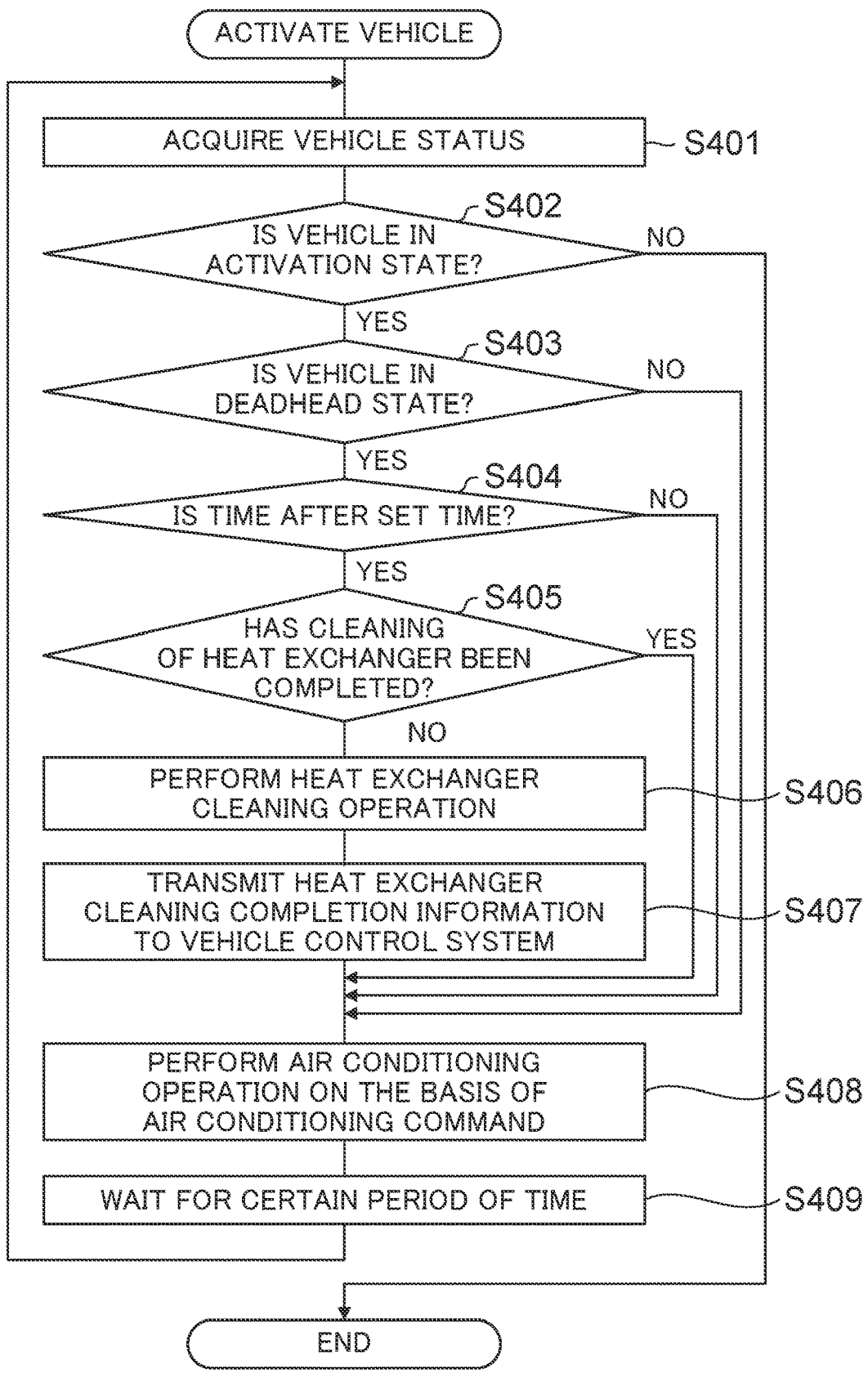
FIG. 5 is a flowchart of control according to a fourth embodiment of the present invention.

FIG. 5 is a flowchart of control of the air conditioning control device 4. The difference from the first embodiment is that a step (Step S404 here) in which the air conditioning control device 4 determines whether the time is after the set time on the basis of the status information of the vehicle is added between a step (Step S403 here) of determining whether or not the vehicle is in the deadhead state in the first embodiment and a step (Step S405 here) of determining the completion of the cleaning of the heat exchangers. Since the other controls (Steps S401 to S403 and S405 to S409) are the same as those (Steps S101 to S103 and S104 to S108) of the first embodiment, the duplicated description is omitted.

For example, if the set time included in the status information is set to 18:00, the air conditioning control device 4 can control the cleaning operation of the heat exchangers in Step S406 to be performed only after 18:00 (for example, during the deadheading of the vehicle). That is, if the set time is appropriately determined, the cleaning operation of the heat exchangers can be performed at the timing of deadheading after the completion of the commercial operation on the day.

By performing the control in this manner, the cleaning operation can be performed after the commercial operation on the day, so that the heat exchangers contaminated with dust or the like during the air conditioning operation can be cleaned without carrying over the contamination to the next day. That is, it is possible to provide an air conditioner for a railroad vehicle that is more excellent in cleanliness and comfort by cleaning the heat exchangers in the air conditioner without causing discomfort to passengers.

Fifth Embodiment

A fifth embodiment of the present invention relates to control for performing a cleaning operation during only a period in which air conditioning is used. The fifth embodiment will be described by using FIG. 6 while focusing on the difference from the first embodiment. The configuration of an air conditioner for a railroad vehicle according to the embodiment is the same as that of the first embodiment shown in FIG. 1.

Figure 6:
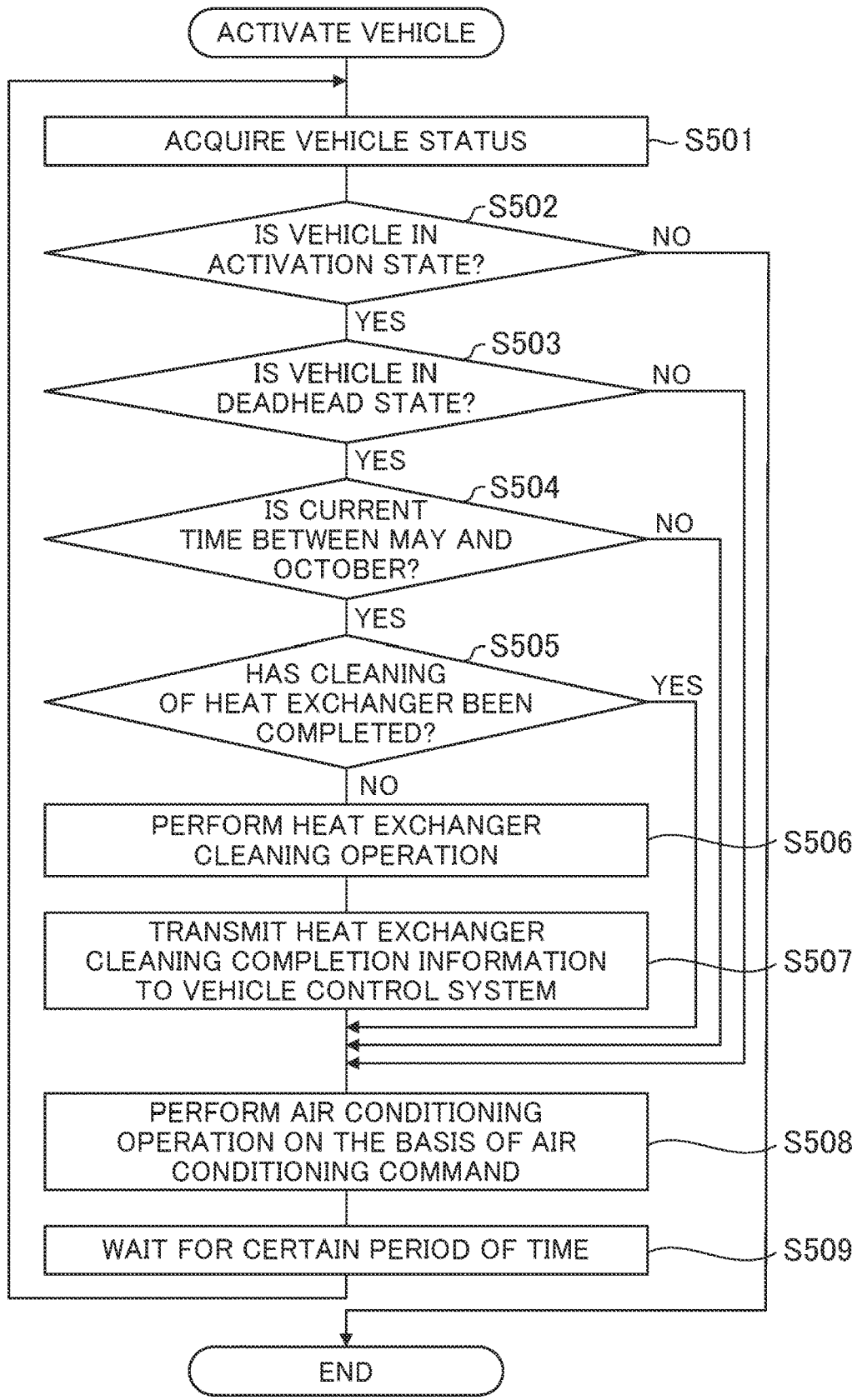
FIG. 6 is a flowchart of control according to a fifth embodiment of the present invention.

FIG. 6 is a flowchart of control of the air conditioning control device 4. The difference from the first embodiment is that a step (Step S504 here) in which the air conditioning control device 4 determines the current period on the basis of the status information is added between a step (Step S503 here) of determining whether or not the vehicle is in the deadhead state in the first embodiment and a step (Step S505 here) of determining the completion of the cleaning of the heat exchangers. Since the other controls (Steps S501 to S503 and S505 to S509) are the same as those (Steps S101 to S103 and S104 to S108) of the first embodiment, the duplicated description is omitted.

For example, in the embodiment, the cleaning period is set to be between May and October during which cooling is used, and only in the case where the air conditioning control device 4 determines that the current time is the cleaning period, it is possible to control to perform the cleaning operation of the heat exchangers in Step S506. Accordingly, the cleaning operation of the heat exchangers is performed during only at least a period in which cooling is used.

By performing the control in this manner, in the case where the air conditioning device is exclusively used for cooling, the cleaning operation can be performed during only a period in which cooling is used, so that the cleaning operation can be prevented from being inefficiently performed during a period such as in winter in which the air conditioning device is not contaminated. That is, it is possible to more efficiently provide an air conditioner for a railroad vehicle that is excellent in cleanliness and comfort by cleaning the heat exchangers in the air conditioner only in a period that is likely to cause discomfort to passengers.

It should be noted that the cleaning of the air conditioner is not limited to the heat exchangers, and other parts may be cleaned under the control of the air conditioning control device 4.

LIST OF REFERENCE SIGNS

1 railroad vehicle
2 vehicle control system
3 refrigeration cycle device
4 air conditioning control device
5 communication line connecting control device and refrigeration cycle device
6 communication line connecting vehicle control system and air conditioning control system

The invention claimed is:

1. An air conditioner for a rail vehicle including a vehicle control system, the air conditioner comprising:
    a refrigeration cycle device that can execute a cleaning operation; and
    an air conditioning control device that controls the refrigeration cycle device,
    wherein the air conditioning control device can communicate with the vehicle control system, has a built-in clock, and has access to at least one of stored vehicle operation time information or stored cooling period information, and
    wherein, based at least on the air conditioning control device determining from the built-in clock and the at least one of the stored vehicle operation time information or the stored cooling period information that a current time is at least one of (1) outside vehicle operating hours or (2) within a cooling period during which the refrigeration cycle device is operated, the air conditioning control device causes the refrigeration cycle device to execute the cleaning operation on a basis of status information obtained from the vehicle control system.

2. The air conditioner for a rail vehicle according to claim 1,
    wherein the air conditioning control device causes the refrigeration cycle device to execute the cleaning operation on a basis of at least information of whether or not the rail vehicle is in a deadhead state obtained from the vehicle control system.

3. The air conditioner for a rail vehicle according to claim 1,
    wherein the air conditioning control device causes the refrigeration cycle device to execute the cleaning operation on a basis of at least information of the current position of the rail vehicle obtained from the vehicle control system.

4. The air conditioner for a rail vehicle according to claim 1,
    wherein the air conditioning control device causes the refrigeration cycle device to execute the cleaning operation on a basis of at least information for specifying the rail vehicle obtained from the vehicle control system.

5. The air conditioner for a rail vehicle according to claim 1,
    wherein the air conditioning control device causes the refrigeration cycle device to execute the cleaning operation on a basis of at least command information obtained from the vehicle control system.

6. The air conditioner for a rail vehicle according to claim 1,
    wherein the air conditioning control device causes the refrigeration cycle device to execute the cleaning operation on a basis of at least time information obtained from the vehicle control system.

7. The air conditioner for a rail vehicle according to claim 1,
    wherein the air conditioning control device causes the refrigeration cycle device to execute the cleaning operation on a basis of at least date information obtained from the vehicle control system.

* * * * *